US010778839B1

(12) United States Patent
Newstadt et al.

(10) Patent No.: US 10,778,839 B1
(45) Date of Patent: Sep. 15, 2020

(54) DETECTING AND PREVENTING PHISHING PHONE CALLS THROUGH VERIFIED ATTRIBUTE ANALYSIS (71) Applicant: Symantec Corporation, Mountain View, CA (US)

(72) Inventors: Keith Newstadt, West Newton, MA (US); Ilya Sokolov, Boston, MA (US); Venkadesan Marimuthu, Chennai (IN)

(73) Assignee: NORTONLIFELOCK, INC., Mountain View, CA (US)

( * ) Notice: Subject to any disclaimer, the term of this patent is extended or adjusted under 35 U.S.C. 154(b) by 279 days.

(21) Appl. No.: 15/942,206

(22) Filed: Mar. 30, 2018

(51) Int. Cl.
*H04M 3/436* (2006.01)
*H04M 1/663* (2006.01)
*H04M 3/42* (2006.01)
*H04L 9/32* (2006.01)
*H04L 9/08* (2006.01)

(52) U.S. Cl.
CPC .......... *H04M 3/436* (2013.01); *H04L 9/0825* (2013.01); *H04L 9/3213* (2013.01); *H04M 1/663* (2013.01); *H04M 3/42059* (2013.01); *H04M 2201/40* (2013.01); *H04M 2203/558* (2013.01); *H04M 2203/6027* (2013.01); *H04M 2203/6045* (2013.01)

(58) Field of Classification Search
CPC .... H04L 9/0825; H04L 9/3213; H04M 3/436; H04M 2201/40; H04M 1/663; H04M 3/42059; H04M 2203/558; H04M 2203/6027; H04M 2203/6045
USPC .......................................................... 713/159
See application file for complete search history.

(56) References Cited

U.S. PATENT DOCUMENTS

| 8,863,308 | B2* | 10/2014 | Boysen | G06F 21/335 726/29 |
| 2004/0059915 | A1* | 3/2004 | Laniepce | H04M 1/67 713/169 |
| 2004/0066916 | A1* | 4/2004 | Brown | H04M 3/42 379/88.01 |
| 2008/0292077 | A1* | 11/2008 | Vinokurov | H04M 3/436 379/142.04 |
| 2009/0067410 | A1* | 3/2009 | Sterman | H04L 29/06027 370/352 |
| 2011/0225656 | A1* | 9/2011 | Gruper | H04L 63/1433 726/25 |

(Continued)

OTHER PUBLICATIONS

NPL Search Results (Year: 2020).*

(Continued)

*Primary Examiner* — Syed A Zaidi
(74) *Attorney, Agent, or Firm* — Patent Law Works LLP (57) ABSTRACT A method for detecting and preventing phishing phone calls through verified attribute analysis is described. The method may comprise receiving, by a receiving device, a phone call from a sending device and receiving identification data in parallel with the phone call, the identification data describing context of the phone call. The method may then identify an attribute assertion from the identification data. The attribute assertion may comprise a signed attribute of the phone call and may be signed by a trusted authority. The method may comprise determining content of the phone call, analyzing the content of the phone call against the signed attribute, and performing a defined operation based on a result of the analysis of the content against the signed attribute.

20 Claims, 5 Drawing Sheets

(56) References Cited

U.S. PATENT DOCUMENTS

| | | | | |
|---|---|---|---|---|
| 2011/0287748 | A1* | 11/2011 | Angel | H04M 3/42221 455/414.1 |
| 2012/0321066 | A1* | 12/2012 | Keast | H04W 12/0609 379/221.14 |
| 2014/0230033 | A1* | 8/2014 | Duncan | G06F 21/32 726/7 |
| 2015/0156300 | A1* | 6/2015 | Park | H04M 1/663 455/414.1 |
| 2015/0332128 | A1* | 11/2015 | Sadovsky | G06K 17/0016 382/182 |
| 2015/0379562 | A1* | 12/2015 | Spievak | H04M 3/5158 379/265.09 |
| 2017/0359302 | A1* | 12/2017 | Van Os | G06Q 50/01 |

OTHER PUBLICATIONS

"Maine Judicial Branch warns of phone scam with con artists posing as court workers," Pressherald.com, Apr. 6, 2016, 1 page. Retrieved from the Internet <http://www.pressherald.com/2016/04/06/maine-judicial-branch-warns-of-phone-scam-with-con-artists-posing-as-court-workers/>.

Park, Sunna, "Voice Phishing Scams Learn to Use a Seoul Accent," KoreaBANG, Jul. 19, 2013, 8 pages. Retrieved from the Internet <http://www.koreabang.com/2013/stories/voice-phishing-scams-learn-to-use-a-seoul-accent.htm>.

Parussini, Gabriele et al., "Fake IRS Collection Job Lands India 'Scam Center' Workers in Jail; Police say workers posing as tax collectors earned bonuses for every dollar stolen from U.S. victims," Wall Street Journal (Online), Oct. 7, 2016, 4 pages. Retrieved from the Internet <http://www.wsj.com/articles/fake-irs-collection-job-lands-india-scam-center-workers-in-jail-1475822606>.

Litan, Avivah, "Preventing Fraud in the Call Center with Phone Printing and Voice Biometrics," Forbes.com, Gartner, Inc., Jun. 18, 2014, 3 pages. Retrieving from the Internet <http://www.forbes.com/sites/gartnergroup/2014/06/18/preventing-fraud-in-the-call-oenter-with-phone-printing-and-voioe-biometrics/#74ea4e923584>.

* cited by examiner

DETECTING AND PREVENTING PHISHING PHONE CALLS THROUGH VERIFIED ATTRIBUTE ANALYSIS

TECHNICAL FIELD

This disclosure pertains generally to telecommunication security, and more specifically to detecting and preventing fraudulent or phishing phone calls.

BACKGROUND

Telemarketers, pollsters, wrong numbers, etc., are distracting and, in some instances, the callers may misrepresent the company or organization for which they work. For instance, callers may misrepresent their identity or other information in an attempt to phish private personal or financial information. For example, a caller might represent that they are from the internal revenue service (IRS) and may ask a callee for their private information, such as their social security number (SSN).

There is little that a callee can do to protect himself from these types of attacks, because a fraudulent caller may imitate the voice characteristics of a person known to the callee, may spoof a fake caller ID, or otherwise pretend to have a particular identity or be from a particular organization.

While some techniques for identifying the caller exist, these existing methods can be easily spoofed by a sophisticated fraudulent caller. For instance, some such existing techniques for detecting fraudulent callers include voice recognition, checking a caller ID, or tracing telephone calls. However, even if a phone route is known, there is no asserted information that this specific phone at that specific location actually belongs to this specific organization. Similarly, while some existing techniques detect keywords in conversations and determine that a conversation is potentially fraudulent based on the keywords, these systems result in a large number of false positives because they cannot reliably verify the keywords for legitimate calls.

While techniques for verifying websites and phishing e-mails exists, these existing techniques are not directly applicable for phishing or spam phone calls. For example, unlike the case of Secure Sockets Layer where a browser requests a webpage and matches a certificate to a webpage, a receiving phone does not initiate the phone call, but rather receives it, so the identity of the caller or attributes of the call cannot be verified by the callee, but must be assumed to be accurate. Therefore no satisfactory techniques exist for detecting and preventing spam, phishing, or other fraudulent phone calls.

It is desirable to address these issues.

SUMMARY

A receiving computing device, such as a smartphone, may receive, at a receiving device, a phone call from a sending device, such as another smartphone. In some embodiments, the computing device may receive identification data in parallel with the phone call. The identification data may describe context of the phone call. For example, the identification data may comprise a token identifying a caller of the sending device or signed attributes.

In some embodiments, the receiving device may identify an attribute assertion from the identification data, the attribute assertion comprising a signed attribute of the phone call, the signed attribute being signed by a trusted authority server. For instance, the signed attribute may comprise a verified identity of the caller or may specify a projected topic of the phone call. In some embodiments, the signed attribute may be valid for a unique phone call. In some embodiments, identifying the attribute assertion from the identification data may comprise transmitting the token to the trusted authority server, receiving the attribute assertion comprising the signed attribute of the phone call from the trusted authority server, the signed attribute being signed using a private key of the trusted authority server, and validating the signed attribute using a public key of the trusted authority server. In some embodiments, identifying the attribute assertion from the identification data may comprise validating the signed attribute using a public key of the trusted authority server, the signed attribute being received from the sending device in the identification data.

In some embodiments, the computing device may determine content of the phone call. For instance, determining the content of the phone call may comprise generating a transcription of the phone call during the phone call and determining the content of the phone call may be based on analysis of the transcription. In some embodiments, determining the content of the phone call comprises determining a verbal identification of a caller of the sending device based on verbal information provided by the caller.

In some embodiments, the computing device may analyze the content of the phone call against the signed attribute. For instance, analyzing the content of the phone call against the signed attribute may comprise determining whether the verbal identification of the caller matches the verified identity of the caller. Analyzing the content of the phone call against the signed attribute may comprise identifying a topic of the phone call and comparing the topic of the phone call to the projected topic specified by the signed attribute.

In some embodiments, the computing device may determine a level of similarity between the verified identity and one or more caller identities in a database and, in response to determining that the level of similarity satisfies a threshold, may flag the phone call as potentially fraudulent.

In some embodiments, the computing device may perform a defined operation based on a result of the analysis of the content against the signed attribute. For instance, the computing device may terminate the phone call or provide an alert to the receiving device signaling to a user of the receiving device that the phone call is potentially fraudulent.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiments for purposes of illustration only. One skilled in the art will readily recognize from the following discussion that alternative embodiments of the structures and methods illustrated herein may be employed without departing from the principles described herein.

DESCRIPTION

A call security management system is described herein that uses verified attributes to detect and, in some instances, prevent or otherwise thwart phishing calls. For example, the call security management system may include a call validation system 123 and a call authentication system 121, as discussed herein, for authenticating attributes of a phone call. In some embodiments, the techniques described herein are designed to detect and prevent phishing phone calls through verified attribute analysis. For instance, some embodiments of the techniques may automatically compare signed, verified asserted attributes against claims made in a conversation.

In some embodiments, a caller using a sending phone 103 may verify an attribute, such as their identity or the identity of an organization that the caller is calling on behalf of, with a trusted identity proofing authority. The trusted identity proofing authority may issue a signed (e.g., authenticated and, in some instance, signed with a private key of the trusted identity proofing authority) attribute or assertion to the sending phone 103 of the caller. When making a phone call, the signed attribute may be transmitted to the receiving phone 109 of a callee, which may verify the signed attribute (e.g., using a public key of the trusted identity proofing authority) and, in some instances, compare the signed attribute with context of the call and/or the verbal claims of the caller during the phone call.

It should be noted that, while the techniques herein are described in reference to telephone, "phone" call, or "call," the same concepts may be applied to other forms of calls or communication, such as a video call, group call, conference call, voice/video over IP session, and text based conversation or chat, etc.

With reference to the figures, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

Figure 1:
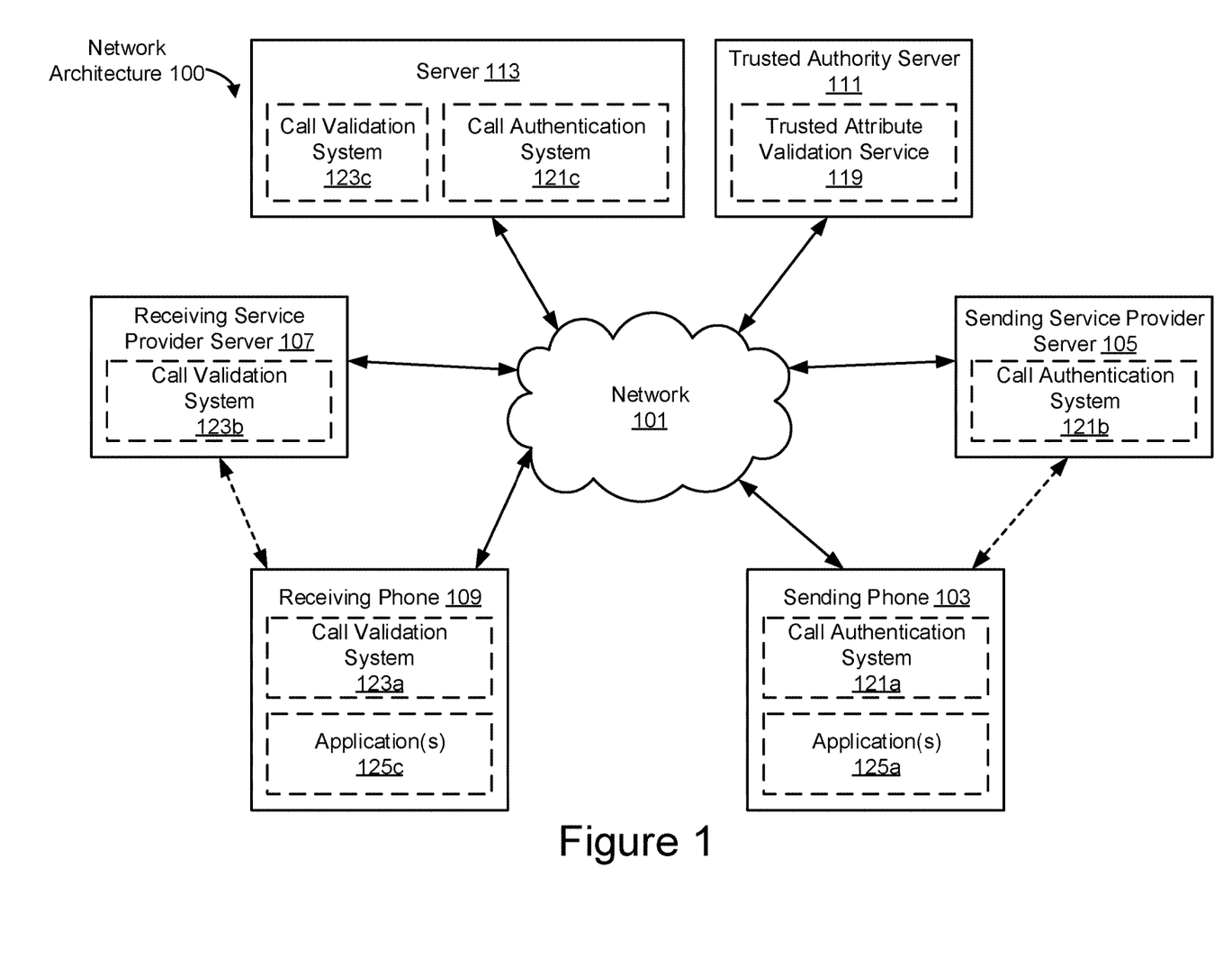
FIG. 1 is a block diagram of an exemplary network architecture in which a call security management system can be implemented, according to some embodiments.

FIG. 1 is a block diagram illustrating an exemplary network architecture 100 in which a call security management system can be implemented. The call security management system may include one or more of a call validation system 123, call authentication system 121, and/or a trusted attribute validation service 119, depending on the embodiment. The illustrated network architecture 100 comprises multiple client's devices, such as the sending phone 103, the receiving phone 109, as well as multiple servers, described as the sending service provider server 105, the receiving service provider server 107, the trusted authority server 111, and the server 113. In FIG. 1, a call authentication system 121a, 121b, or 121c is illustrated as residing on a sending phone 103, a sending service provider server 105, or a server 113, respectively. FIG. 1 illustrates a call validation system 123a, 123b, or 123c is illustrated as residing on a receiving phone 109 103, a receiving service provider server 107, or a server 113, respectively. FIG. 1 also illustrates application (s) 125a and 125b, as residing on devices 103 and 109, respectively. It is to be understood that this is an example only, and, in various embodiments, various functionalities of the call authentication system 121, the trusted attribute validation service 119, the call validation system 123, and/or application(s) 125 can be instantiated on one or more of the devices 103, 105, 107, 109, 111, or can be distributed between multiple of these devices.

One or more of the devices 103, 105, 107, and 109 may be implemented using computer systems 210 such as the one illustrated in FIG. 2 and described below. The devices 103, 105, 107, and 109 may be communicatively coupled to a network 101, for example via a network interface 248 or modem 247 as described below in conjunction with FIG. 2. In some embodiments, client devices, such as the sending phone 103 and the receiving phone 109 may be able to access applications and/or data on servers 105, 107, 111, or 113 using, for example, a web browser, application(s) 125, or other client software (not shown), etc. The sending and receiving phones 103 and 109 may be in the form of telephone end points, such as smart phones, IP phones, computing devices with softphone capabilities, or other computing devices capable of enabling a user to make or receive phone calls, for example. In some embodiments, the sending and receiving phones 103 and 109 may be capable of running applications 121, 123, or 125.

Although FIG. 1 illustrates two phones 103 and 109 and four servers 105, 107, 111, and 113 as an example, in practice many more (or fewer) such devices may be deployed. In some embodiments, the network 101 is in the form of the Internet. In some embodiments, the network 101 may include one or more cellular networks, local or wide area networks, or telecommunications networks. Other networks 101 or network-based environments can be used in other embodiments.

The example network architecture 100 illustrated in FIG. 1 shows a network 101; a trusted attribute validation service 119 operable on a trusted authority server 111, a call authentication system 121 operable on a sending phone 103, sending service provider server 105, or a server 113; and a call validation system 123 operable on a receiving phone 109, a receiving service provider server 107, or a server 113, depending on the implementation. The servers 105, 107, 111, and 113 may represent first and/or third party servers for implementing aspects of the technology described herein, for example. The application(s) 125 may represent any applications, such as a browser or dedicated application, operable on a phone 103 or 109.

The call authentication system 121 may include computer logic operable to transmit data to or receive, retrieve, or process data from entities of the network architecture 100. The call authentication system 121 may use the data from the sending phone 103, the sending service provider server 105, the trusted authority server 111, and/or application(s) operable thereon, for example, to authenticate a caller or sending phone 103. For instance, call authentication system 121 may be configured to receive signed attributes and convey the signed attributes to a receiving phone 109, as well as performing other operations described herein.

The trusted attribute validation service 119 may include computer logic operable to transmit data to or receive, retrieve, or process data from the entities of the network architecture 100. The trusted attribute validation service 119 may generate or sign attributes or attribute assertions for validating attributes of a caller or sending phone 103. For instance, the trusted attribute validation service 119 may perform attribute validation for a caller, call, or sending phone 103, for instance, and provide signed attributes to a sending phone 103 or sending service provider server 105, as described herein. In some embodiments, the trusted attribute validation service 119 may provide signed or otherwise authenticated attributes to a receiving phone 109 or receiving service provider server 107 in response to receiving a token or other artifact from the receiving phone 109 or receiving service provider server 107, for example, as well as performing other operations described herein.

The call validation system 123 may include computer logic operable to transmit data to or receive, retrieve, or process data from entities of the network architecture 100. The call validation system 123 may use the signed attributes or tokens received from the sending phone 103, the sending service provider, the trusted authority server 111, and/or application(s) operable thereon, for example, to identify and/or validate claims from a caller or sending phone 103. For instance, call validation system 123 may be configured to receive signed attributes, validate the attributes, and, in some instances, analyze the phone call for which the attributes are received against the signed attributes, as well as performing other operations described herein.

It should be noted that, for example, while the call authentication system 121 and call validation system 123 may be operable on the sending phone 103 and receiving phone 109, respectively, as described herein (e.g., as a stand-alone application or other software mechanism), the call authentication system 121 and/or call validation system 123 may be used by service providers or used by a communication protocol (e.g., Signaling System No. 7 or SS7) in order to be used natively by any phone.

It should be understood that while these and other embodiments are described throughout this specification, other embodiments and uses for the technology described herein are possible and contemplated.

Figure 2:
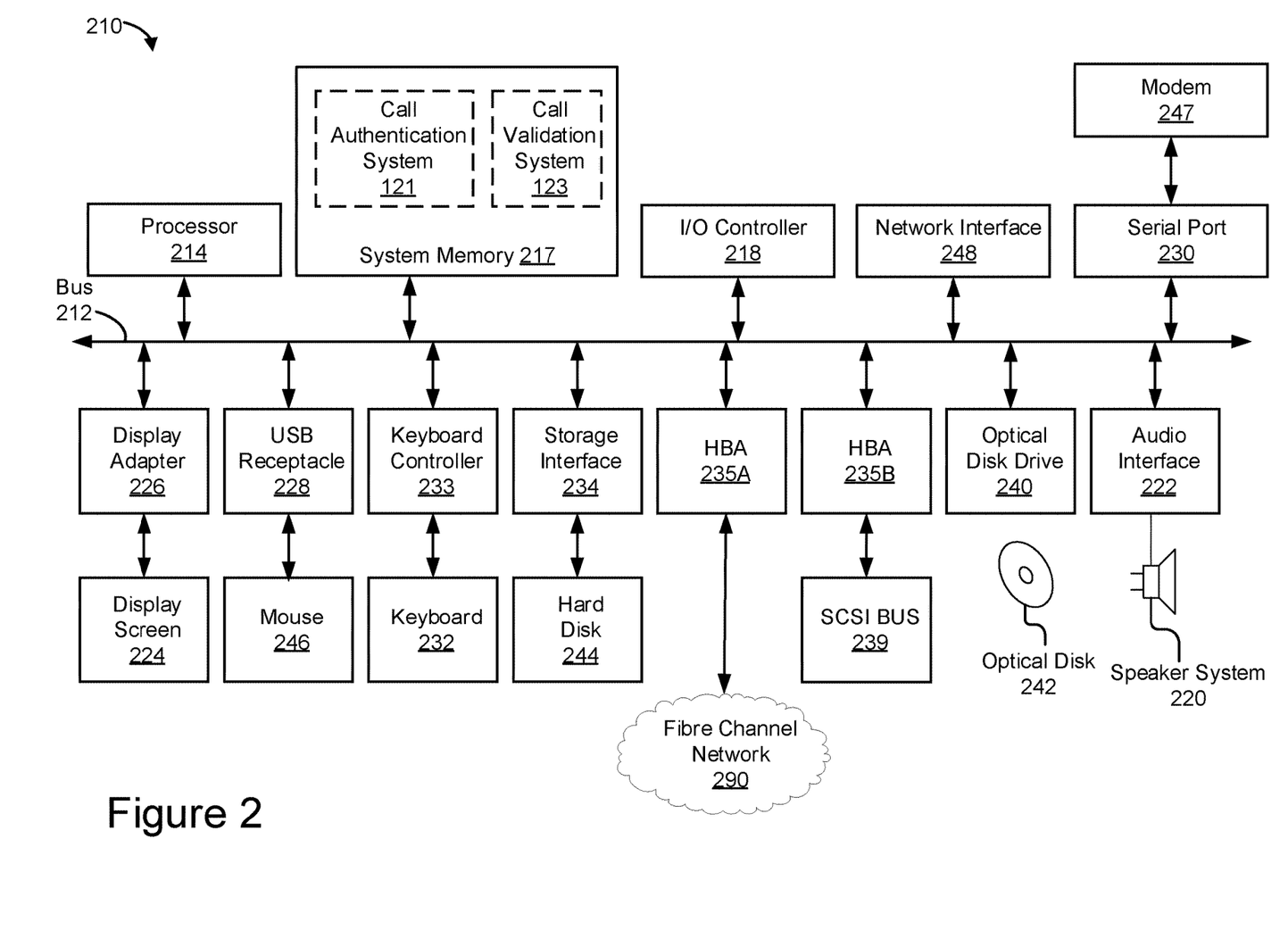
FIG. 2 is a block diagram of a computer system suitable for implementing a call security management system, according to some embodiments.

FIG. 2 is a block diagram of a computer system 210 suitable for implementing a call authentication system 121 and/or a call validation system 123, for example. Client devices, such as the sending and receiving phones 103 or 109, and servers, such as 105, 107, 11, and 113 can be implemented in the form of such computer system 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fiber Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 232 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above, may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs (e.g., in some instances, the call authentication system 121, the call validation system 123, etc.) can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the call authentication system 121 and call validation system 123 are illustrated as residing in system memory 217. Example components of the call authentication system 121 and call validation system 123 are explained in greater detail below in conjunction with FIGS. 3A and 3B.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 101 such as a telecommunications network. Such coupling can be wired or wireless.

Figure 3A:
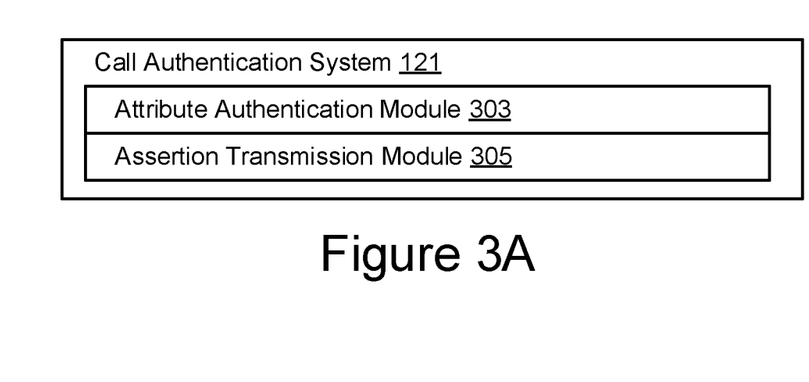
FIGS. 3A and 3B are block diagrams of a call authentication system and call validation system of a call security management system, respectively, according to some embodiments.

FIG. 3A illustrates components of a call authentication system 121, according to some embodiments. As described above, the functionalities of the call authentication system 121 can reside on a server 113, a sending phone 103, a sending service provider server 105, or be distributed between multiple computer systems 210, including within a cloud-based computing environment in which some of the functionality of the call authentication system 121 is provided as a service over a network 101. It is to be understood that although the call authentication system 121 is illustrated in FIG. 3A as a single entity, the illustrated call authentication system 121 may represent a collection of functionalities, which can be instantiated as a single or multiple modules as desired (an instantiation of specific, multiple modules of the call authentication system 121 is illustrated in FIG. 3A). It is to be understood that the modules of the call authentication system 121 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the call authentication system 121 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In some embodiments, the attribute authentication module 303, information entry event detection module, assertion transmission module 305, and/or other components of the call authentication system 121 may be implemented as software, hardware, firmware, or a combination of these. In some embodiments, the attribute authentication module 303 and/or the assertion transmission module 305 may be communicatively coupled by the bus 212 and/or the processor(s) 214 to one another and/or the other components of the computer system 210. In some embodiments, one or more of the components 303 and 305 are sets of instructions executable by the processor(s) 214. In further embodiments, one or more of the components 303 or 305 are storable in the memory(ies) 217 and are accessible and executable by the processor(s) 214. In any of the foregoing embodiments, these components 303 and 305 may be adapted for cooperation and communication with the processor(s) 214 and other components of the computer system 210.

Figure 4:
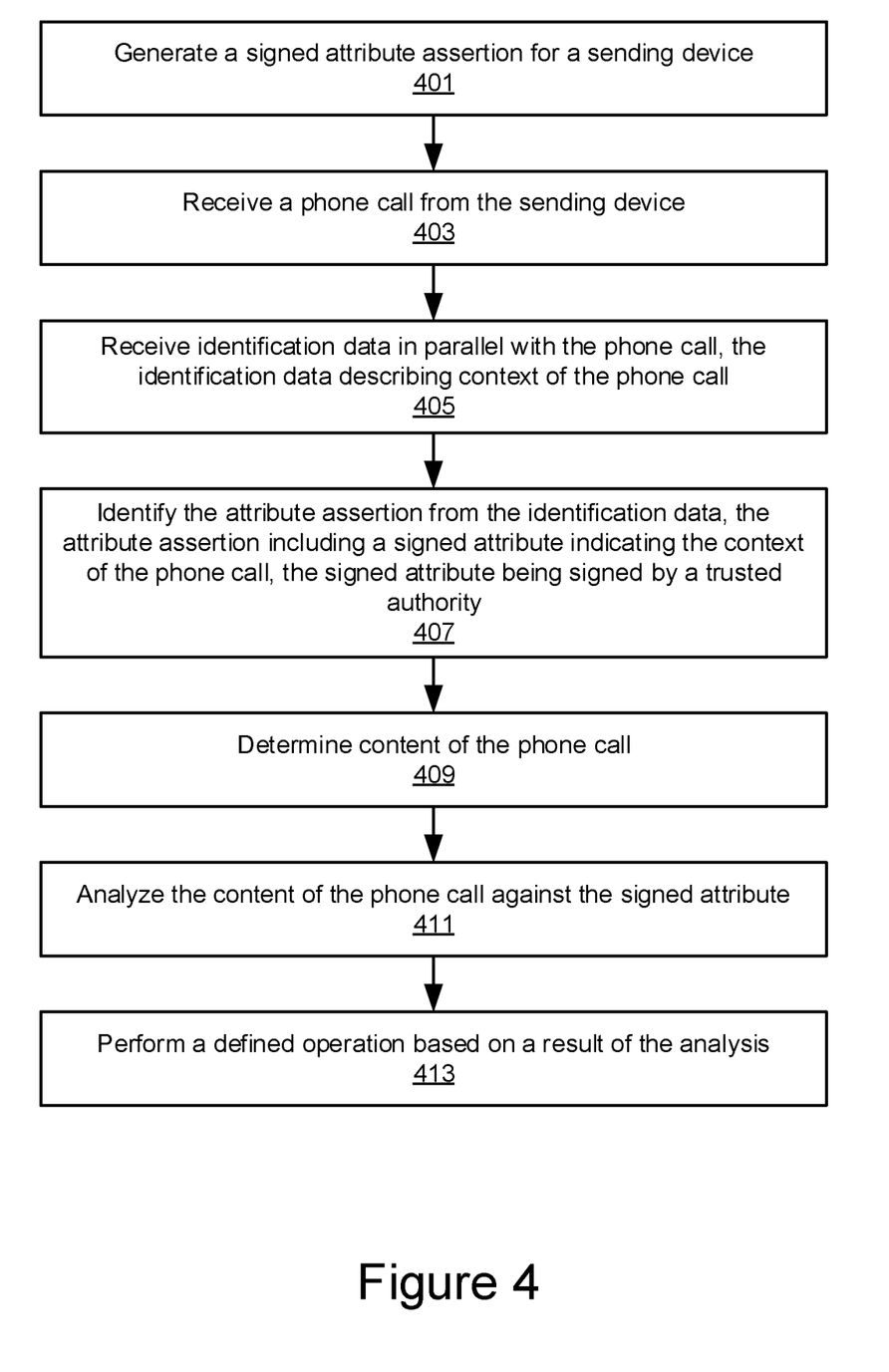
FIG. 4 is a flowchart of an example method for detecting and preventing phishing phone calls through verified attribute analysis, according to some embodiments.
Figure 5:
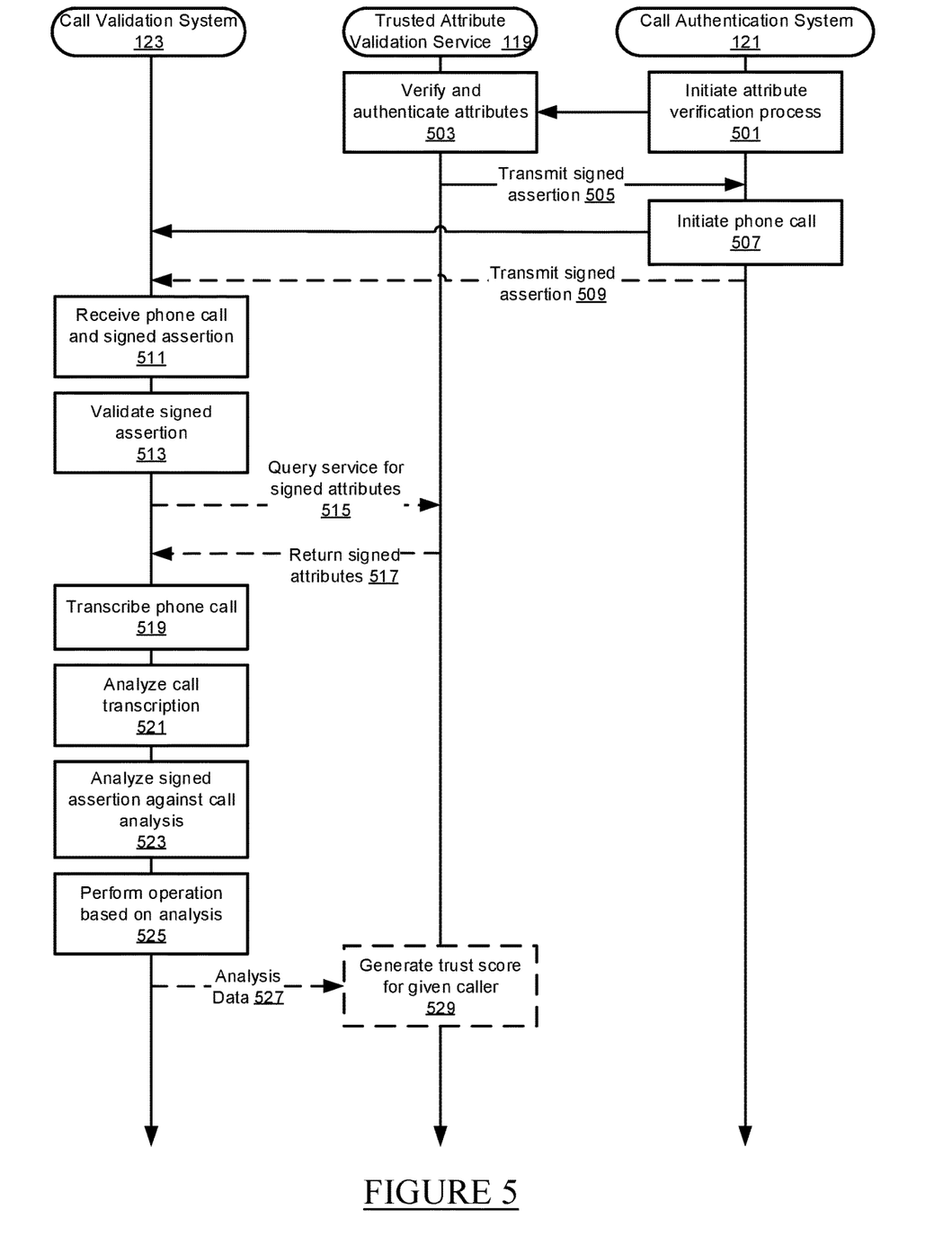
FIG. 5 is a signal diagram of an example method for detecting and preventing phishing phone calls through verified attribute analysis, according to some embodiments.

In some embodiments, the attribute authentication module 303 and/or the assertion transmission module 305 may include computer logic operable to perform the operations described in further detail throughout this specification, for example, in reference to FIGS. 4 and 5. For example, the attribute authentication module 303 may be programmed to communicate with the trusted attribute validation service 119 to authenticate attributes for a sending phone 103, caller, or call; and the assertion transmission module 305 may be programmed to communicate the signed attributes, for example, in a token or attribute assertion, to the call validation system 123.

Figure 3B:
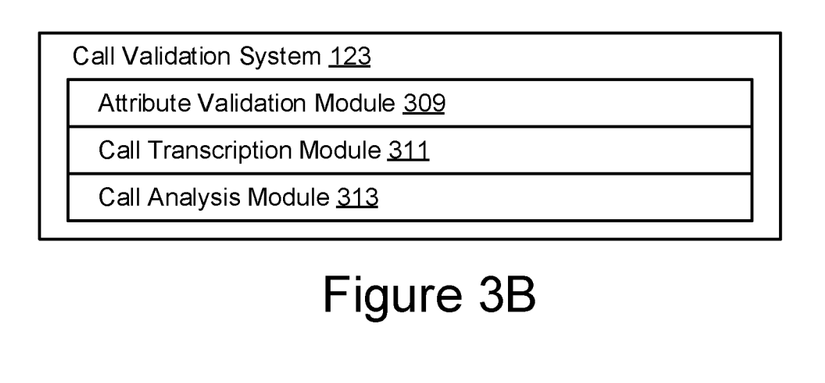

FIG. 3B illustrates components of a call validation system 123, according to some embodiments. As described above, the functionalities of the call validation system 123 can reside on a server 113, a receiving phone 109, receiving service provider server 107, or be distributed between multiple computer systems 210, including within a cloud-based computing environment in which some of the functionality of the call validation system 123 is provided as a service over a network 101. It is to be understood that although the call validation system 123 is illustrated in FIG. 3B as a single entity, the illustrated call validation system 123 may represent a collection of functionalities, which can be instantiated as a single or multiple modules as desired (an instantiation of specific, multiple modules of the call validation system 123 is illustrated in FIG. 3B). It is to be understood that the modules of the call validation system 123 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. Additionally, program code to implement the functionalities of the call validation system 123 can be stored on computer-readable storage media.

In some embodiments, the attribute validation module 309, the call transcription module 311, and/or the call analysis module 313 may be implemented as software, hardware, firmware, or a combination of these. In some embodiments, the attribute validation module 309, the call transcription module 311, and/or the call analysis module 313 may be communicatively coupled by the bus 212 and/or the processor(s) 214 to one another and/or the other components of the computer system 210. In some embodiments, one or more of the components 309, 311, and 313 are sets of instructions executable by the processor(s) 214. In further embodiments, one or more of the components 309, 311, and 313 are storable in the memory(ies) 217 and are accessible and executable by the processor(s) 214. In any of the foregoing embodiments, these components 309, 311, and 313 may be adapted for cooperation and communication with the processor(s) 214 and other components of the computer system 210.

In some embodiments, the attribute validation module 309, call transcription module 311, and/or call analysis module 313 may include computer logic operable to perform the operations described in further detail throughout this specification, for example, in reference to FIGS. 4 and 5. For example, the attribute validation module 309 may be programmed to receive, validate, and/or analyze signed attributes; the call transcription module 311 may be programmed to transcribe or otherwise determine content of calls; and the call analysis module 313 may be programmed to analyze the calls and/or signed attributes, for example, by comparing the signed attributes against the call transcriptions.

Additionally, the call authentication system 121 and/or call validation system 123 can be in the form of functionality provided by an application running on a computing device, which in turn can, but need not be, a more comprehensive security application. In some implementations, for example, an instance of the call authentication system 121 and the call validation system 123 may be integrated into a single security application and the respective functionality may be used depending on whether the phone, for example, is acting as a sending phone 103 or a receiving phone 109.

FIG. 4 is a flowchart of an example method for detecting and preventing phishing phone calls through verified attribute analysis, according to some embodiments.

In some embodiments, at 401, the trusted attribute validation service 119 may generate a signed attribute assertion for a sending device. For example, a caller or organization (e.g., a call center or company) associated with a sending phone 103 may enter into an identity or attribute verification process with a trusted attribute validation service 119. The verification process may include, but is not limited to, a manual process, such as one might go through to receive a license, and/or it may include an automated identity proofing process, such as a secure network login. Upon the trusted attribute validation service 119 verifying the one or more attributes, the trusted attribute validation service 119 may provide signed attributes in a signed assertion or an artifact referencing the signed attributes to the call authentication system 121, for example. For instance, in some embodiments, the trusted attribute validation service 119 may transmit a token referencing the signed attributes to the call authentication system 121, which may transmit the token to the call validation system 123 in parallel with making a phone call, and the call validation system 123 may retrieve the signed attributes from the trusted attribute validation service 119, as described in further detail below.

Identity proofing and validation of other attributes may be performed with different frequencies. For example, identity proofing may be performed only once, while individual attributes may be validated for each call or upon some other increment, although it should be understood that other embodiments are possible and contemplated herein.

An attribute assertion may be a document or data file that includes, for example, signed and validated attributes, such as a caller or organization's name, phone number, business name, business category, affiliated institution, voice biometric details, call purpose or topic, etc. The attribute assertion may be valid for a defined time period (e.g., 5 minutes, 10 minutes, 1 hour, 1 day, etc.), for a single phone call, for a defined number of calls, or may expire in response to some other criterion. In some embodiments, different attributes may be valid for different durations. For instance, an identity attribute may be valid for one work shift (e.g., 8 hours or until a caller signs out of the call authentication system 121) while a call purpose or topic may be valid for only a single use/phone call. It should be noted that, for the purposes of description herein, the attribute assertion may also or alternatively be referred to as a signed assertion or simply an assertion.

In some embodiments, a caller, organization (e.g., a business or call center calling on behalf of a business), particular instance of the call authentication system 121, and/or sending phone 103 may be authorized for specific instances of verified attribute use, for example, attribute assertions containing verified attributes may be issued for specific phone conversations. For instance, the caller may authenticate his identity to the trusted attribute validation service 119 and may be granted a different set of attributes for each specific conversation or set of conversations. As an example, a bank employee may be authorized to call a particular individual (e.g., specific person, receiving phone 109, or phone number) from his bank phone (e.g., the sending phone 103) regarding a specific account for a first call, authorized for a second account for a second call, and not authorized at all to call a third account (e.g., if someone using the bank phone is attempting to commit fraud using the bank phone).

At 403, the receiving phone 109 may receive a phone call from the sending phone 103 and, at 405, the call validation system 123 (e.g., by the attribute validation module 309) may receive identification data in parallel with the phone call. The call validation system 123 may receive the identification data either before answering the call, when the call is answered, or shortly after answering the call, depending on the implementation, although, it should be noted that the techniques described herein are applicable to identification data received after the phone call is terminated.

The identification data may include data describing context of the phone call. For example, the context data may include a phone number of the sending phone 103, a caller identification (e.g., a caller ID), and/or an attribute assertion (or token representing the signed attributes).

As described elsewhere herein, the attribute assertion may be sent on the same or different channel as the phone call. For instance, the attribute assertion may be transmitted via SS7, the Internet (e.g., a Multimedia Message or MMS, a push notification, or other communication), or via another channel.

At 407, the call validation system 123 (e.g., by the attribute validation module 309) may identify the attribute assertion from the identification data. The attribute assertion may include a signed attribute indicating the context of the phone call, which may be signed by a trusted authority, such as the trusted attribute validation service 119. As the attributes are signed by a known trusted attribute validation service 119, the call validation system 123 can be certain that they're valid and, in some instances, the signatures may be validated by the call validation system 123 on the receiving phone 109, the receiving service provider server 107, or the server 113, depending on the implementation.

In some embodiments, the attribute validation module 309 may validate the signed attributes, for example, by decrypting the signed attributes using a public key(s) of the trusted attribute validation service 119.

In some embodiments where the identification data includes a token (or other artifact) identifying a caller of the sending phone 103, identifying the attribute assertion from the identification data may include transmitting the token to the trusted authority server 111, receiving the attribute assertion including the signed attribute (e.g., the signed attribute being signed using a private key of the trusted authority server 111) of the phone call from the trusted authority server 111, and validating the signed attribute using a public key of the trusted authority server 111, for example, as described in further detail below.

At 409, the call validation system 123 may determine content of the phone call. For example, the call transcription module 311 may generate a transcription of the phone call during the phone call and extract information from the transcription to detect information about the call. For instance, the call transcription module 311 may extract keywords (e.g., social security numbers, account numbers, names, organizations, etc.) or other claims made by the caller during the call about facts, such as the origin of the call, the identity of the caller, the organization representing the caller, etc. It should be noted that the content determination may be performed without transcribing the call, for example, by detecting spoken keywords, intonation, accent or other voice characteristics, etc.

For example, the content of the call may include a verbal identification of the caller (or organization of the caller) of the sending phone 103 based on verbal information provided by the caller, a topic of the phone call, or other claims made during the call, especially by the caller.

It should be noted that the content identification (e.g., recording, transcription, and/or analysis) may be performed by the receiving phone 109, the receiving service provider server 107, or the server 113. In some embodiments, the receiving phone 109 may perform the operations at 407-411. In some embodiments, the receiving phone 109 may upload the audio or transcription to a receiving service provider server 107 or server 113 to perform one or more of these operations. In some embodiments, the receiving service provider server 107 or the server 113 (or even the sending service provider server 105) may be configured to act as an intermediary to the call and perform one or more of these or other operations described, for instance, in reference to the call validation system 123.

At 411, the call validation system 123 may analyze the content of the phone call against the signed attribute, for example, by comparing verbal claims made during the call against an attribute assertion. For instance, the call validation system 123 may detect a deviation from an expected attribute, claim, identity, etc., and may flag the call as potentially fraudulent, spam, fishing, etc. In some embodiments, the flag may include a level of certainty based on a quantity and/or certainty of deviations from expected values and the call and/or caller may be flagged based on satisfying a threshold level of certainty.

In some embodiments, the call analysis module 313 may differentiate between spam and fraudulent or phishing calls based on specific keywords used during the call. For instance, a question by the caller requesting a social security number may indicate that the call is phishing while being indirect, vague, or misrepresenting the caller's identity may indicate that a call is spam.

In some instances, the caller may claim to represent organization A, but a signed attribute indicates that he works for organization B. For example, where a signed attribute includes a verified identity of the caller, the call analysis module 313 may determine whether a verbal identification of the caller matches the verified identity of the caller.

In some instances, where a signed attribute specifies a projected topic of the phone call, the call analysis module 313 may determine whether the topic of the phone call matches the projected topic. For example, the caller may indicate that he is calling regarding a credit card bill, but the verified attribute may indicate that the caller is only authorized to call for a political survey.

In some embodiments, as described in further detail in reference to FIG. 5, the call validation system 123 may identify that a caller is claiming to be from organization A, but may determine that no signed attributes are received (e.g., at all or as part of a received attribute assertion) identifying the caller or organization. In some instances, the call validation system 123 may determine (e.g., based on historical behavior data or a defined setting) that callers from organization A must provide signed attributes, such as a verified identification, and therefore the call may be flagged as potentially fraudulent.

It should be noted that other methods of analysis are possible and contemplated herein, for instance, examples of validation and analysis are described in further detail in reference to FIG. 5.

At 413, the call validation system 123 may perform a defined operation based on a result of the analysis. In some embodiments, the call validation system 123 may perform various operations based on whether the call is flagged as fraudulent, spam, phishing, etc. For example, in response to determining that a call is spam, the call validation system 123 may provide an alert (e.g., an audible or visual alert) to the callee on the receiving phone 109, and, in response to determining that the call is phishing, the call validation system 123 may automatically terminate the phone call.

In some embodiments, the call validation system 123 may provide an alert to the receiving phone 109 signaling to a user/callee of the receiving phone 109 that the phone call is potentially fraudulent. For instance, an alert may be output at a first level of certainty that the call is fraudulent, while the call may be automatically terminated at a second level of certainty that the call is fraudulent.

In some embodiments, if a call is flagged as spam or fraudulent, or if another discrepancy is detected, the caller may be sent to an automatic verification process before the call may be continued. For instance, the call validation system 123 may interrupt the call and redirect the caller to a trusted authentication service, such as the trusted attribute validation service 119.

FIG. 5 is a signal diagram of an example method for detecting and preventing phishing phone calls through verified attribute analysis, according to some embodiments. FIG. 5 provides additional operations and communication details, for example, to the technology described elsewhere herein, for example, in reference to FIG. 4.

At 501, the attribute authentication module 303 may initiate an attribute verification process, for example, by communicating with the trusted attribute validation service 119 and, at 503, the trusted attribute validation service 119 may verify and authenticate the attributes.

For example, a caller, organization, sending phone 103, or sending service provider server 105 that wants to make a call with signed attributes may apply to a trusted authority, such as the trusted attribute validation service 119, to confirm their identity and/or other attributes. Upon verifying the identity of the caller (e.g., using known methods for verification), for instance, the trusted attribute validation service 119 may sign one or more attributes in an assertion and/or the assertion itself, for example, using a private key of the trusted attribute validation service 119.

At 505, the trusted attribute validation service 119 may transmit a signed assertion to the call authentication system 121.

In some embodiments, the trusted attribute validation service 119 may use direct binding to communicate the signed attributes. For example, as used herein, direct binding may include sending the signed assertion (e.g., including the signed attributes) to the call authentication system 121, which may transmit the signed assertion to a call validation system 123 in parallel with placing a call to the receiving phone 109.

In some embodiments, the trusted attribute validation service 119 may use artifact binding to communicate the signed attributes. For example, as used herein, artifact binding may include sending an artifact (e.g., a token) representing the signed assertion or signed attributes to the call authentication system 121, which may in turn transmit the artifact to a call validation system 123 in parallel with placing a call to the receiving phone 109. In some instances, the call validation system 123 may then use the artifact to retrieve the signed attributes from the trusted attribute validation service 119, for example, as described in reference to operations 515 and 517 below.

At 507, the sending phone 103 may initiate a phone call to a receiving phone 109 and, at 509, the call authentication system 121 may transmit the signed assertion (or the artifact representing the signed assertion, depending on the implementation) to the call validation system 123. In some embodiments, when a caller initiates a phone call on the sending phone 103, the call authentication system 121 may present a one-time challenge (e.g., in an audio or graphical interface) to the caller when the caller initiates the call to allow a single use of the signed assertion/signed attributes and/or prevent unauthorized transmission of the signed assertion.

All or a subset of the signed attributes may be sent to the call validation system 123, for example, via the same connection as the phone call, such as via the same protocol that caller ID is delivered on, the SS7 network, a modem signal on a connected connection, etc. In some embodiments, the signed attributes may be sent via separate connection, for example, via the Internet and/or using mobile push capabilities. Since various methods could be leveraged, some embodiments of the communication are not dependent on cooperation from telecommunication providers.

At 511, the call validation system 123 may receive the phone call and signed assertion and, at 513, may validate the signed assertion. In some embodiments, identifying the attribute assertion from the identification data includes validating the signed attribute using a public key of the trusted authority server 111.

In some embodiments, the call validation system 123 (or another component of the architecture 100, such as the trusted attribute validation service 119) may determine whether a callee is attempting to game the system through its signed assertions. For example, if a call authentication system 121 attempts to register an identity in the name of IRS for their company named "India Research Systems" or they try to register AT&T for their company "Awesome T-Shirts and Trousers," the trusted attribute validation service 119 may determine that "IRS" or "AT&T" may be confused with the Internal Revenue Service or American Telephone & Telegraph. While IRS and AT&T are accurate identifications for India Research Systems and Awesome T-Shirts and Trousers, respectively, they are likely to be confused by certain callees (e.g., in the United States, AT&T phone customers). Accordingly, in some instances, the trusted attribute validation service 119 may insert additional information into the signed attributes indicating that this particular instance of IRS and AT&T may be fraudulent or that these callers are not validated to discuss tax information or cell phone bills, for example.

For example, in instances where the signed attribute includes a verified identity of a caller associated with the sending device of the phone call, the call validation system 123 or trusted attribute validation service 119 may determine a level of similarity between the verified identity and one or more caller identities (e.g., identifications of organizations, as described in the above example) in a database. In some embodiments, in response to determining that the level of similarity satisfies a threshold, it may flag the phone call as potentially fraudulent and provide an alert to the receiving phone 109 signaling to a callee of the receiving phone 109 that the phone call is potentially fraudulent.

In some embodiments, the attribute validation module 309 may receive the signed identity of the caller, which may include a flag indicating the potential confusion and may output an alert (e.g., via audio or graphical interface) to the callee on the receiving phone 109 indicating the potential confusion. Similarly, the call analysis module 313 may be alerted to pay particular attention to whether a call from India Research Systems includes discussion of tax or social security information or whether a call from Awesome T-Shirts and Trousers discusses cellular accounts, even if the signed attributes do not include references to tax, social security information, or cellular accounts, respectively.

At 515 and 517, the call validation system 123 may query the trusted attribute validation service 119 for signed attributes and receive the signed attributes. For example, where the call validation system 123 received an artifact (e.g., a token) representing the signed assertion or signed attributes from the call authentication system 121 (e.g., at 509), the attribute validation module 309 may query the trusted attribute validation service 119 for the signed attributes. For example, when the receiving phone 109 receives the phone call, together as part of the handshake to establish that phone call, the assertion is delivered to the call validation system 123 with a token that may be used to call a trusted authority to download the set of attributes.

In some embodiments, at 519, the call transcription module 311 may transcribe the phone call and, at 521, the transcription may be analyzed to extract the sense or content of the call. This may occur during or after the phone call. For instance, the transcription and/or analysis may be performed in real time during the call. As described above, the transcription and/or analysis may be performed on the receiving phone 109, on a receiving service provider server 107, or a server 113. For instance, the call audio may be uploaded to a server 107 or 113 or a server 107 or 113 may act as an intermediary analyzing the call audio.

It should be noted that although transcription to text is described, the analysis of the content of the call could additionally or alternatively be based on intonation, audio detection of words, detection of emotion, whether a caller speaks slowly or quickly, etc. For instance, the "transcription" may include converting one or more of these factors into some machine-readable format.

At 523, the call analysis module 313 may analyze the signed assertion against the call analysis. For instance, the verbal claims in the call may be verified against the signed attributes or absence of signed attributes.

In some embodiments, the analysis may include a direct match between verbal claims in the call with signed attributes. For instance, a caller may claim to be from organization A, but the signed attributes indicate that the caller is from organization B, in which instance, the call may be flagged as fraudulent.

In some embodiments, the analysis may include determining that a call including a certain claim should have a corresponding signed attribute. For instance, the call analysis module 313 may determine that a caller identifies himself as being from the IRS or Internal Revenue Service and that the IRS requires that all of their outgoing calls include the signed attribute. In such case, the call analysis module 313 may flag the call as fraudulent. Similarly, the analysis may determine that calls from the IRS typically (e.g., beyond a threshold frequency) include signed identifications, in which case, the call analysis module 313 may flag the call or caller as potentially fraudulent or suspicious (even if, for example, the call is from an IRS phone number).

Similarly, the analysis may be based on typical behavior of an organization. For instance, the call validation system 123 (or another component of the architecture 100, such as the trusted attribute validation service 119) may monitor phone calls, including determining a typical call volume from the real AT&T wireless company but may then suddenly detect a jump in phone calls from the Awesome T-shirts and Trousers Company. For instance, the Awesome T-shirts and trousers company didn't exist a day ago, but it is now calling a large number of AT&T customers and asking them to disclose their personal information. In such cases, the call analysis module 313 (or the trusted attribute validation service 119, for example, as described in reference to 513) may flag the call as potentially fraudulent.

In some embodiments, the comparison of claims to signed attributes may extend beyond simple matching. For instance, the call analysis module 313 may use natural language processing, context analysis, and fuzzy text comparison to determine potentially fraudulent caller activity (e.g., use of "IRS," "AT&T," or similar when not from the well-known entities that a caller would likely think about). Similarly the call analysis module 313 (or another entity of the architecture 100, such as the trusted attribute validation service 119) may use additional user information (e.g., a list of accounts stored in identity safe vault, job history from LinkedIn®, emails from legitimate businesses for which the callee or caller has accounts, etc.) to detect caller generating false verified claims trying to misguide a callee. For example, the call validation system 123 may know that a callee has an account with Toronto-Dominion Bank (TD bank), so the call validation system 123 may warn the callee if a caller from Tanzania District Bank (TD bank) is calling and/or asking the caller to sign in to TD bank portal.

At 525, the call analysis module 313 may flag the call based on an issue in the comparison, an absence of a particular signed attribute, or additional considerations, as described above. The call analysis module 313 may additionally or alternatively output an alert on the receiving phone 109, automatically terminate the call, send the caller to an authentication service, or perform another operation.

In some embodiments, at 527 and 529, the call validation system 123 may transmit analysis data to the trusted attribute validation service 119 (or another server, depending on the implementation), which may generate a trust score for a given caller, phone number, organization, or sending phone 103, for example. The trust scores or reputation data may be aggregated across many callers, callees, and calls to generate more accurate scores. In some embodiments, the trust scores may be further fed back into the operations described herein to further inform the probability that a call is fraudulent or spam, for instance. For example, the trust score may be used by the trusted attribute validation service 119 in deciding whether or what signed attributes to grant, may be included in the signed attribute (e.g., the signed attributes may indicate that a caller is from Awesome T-Shirts and Trousers Company, which has a certain probability of performing phishing), or may be used during the validation and analysis steps at 513 through 523.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
   receiving, by a receiving device, a phone call from a sending device;
   receiving identification data in parallel with the phone call, the identification data describing context of the phone call;
   identifying an attribute assertion from the identification data, the attribute assertion comprising a signed attribute of the phone call, the signed attribute being signed by a trusted authority server;
   determining verbally expressed content of the phone call;
   analyzing the verbally expressed content of the phone call against the signed attribute including comparing the verbally expressed content with the signed attribute; and
   performing a defined operation based on a result of the analysis of the content against the signed attribute.

2. The computer-implemented method of claim 1, wherein determining the content of the phone call comprises generating a transcription of the phone call during the phone call.

3. The computer-implemented method of claim 2, wherein determining the content of the phone call is based on the transcription.

4. The computer-implemented method of claim 1, wherein determining the content of the phone call comprises determining a verbal identification of a caller of the sending device based on verbal information provided by the caller.

5. The computer-implemented method of claim 4, wherein the signed attribute comprises a verified identity of the caller, and analyzing the content of the phone call against the signed attribute comprises determining whether the verbal identification of the caller matches the verified identity of the caller.

6. The computer-implemented method of claim 1, wherein:
   the signed attribute specifies a projected topic of the phone call; and
   analyzing the content of the phone call against the signed attribute comprises identifying a topic of the phone call and comparing the topic of the phone call to the projected topic specified by the signed attribute.

7. The computer-implemented method of claim 1, comprising:
   wherein the signed attribute comprises a verified identity of a caller associated with the sending device of the phone call;
   determining a level of similarity between the verified identity and one or more caller identities in a database;
   in response to determining that the level of similarity satisfies a threshold, flagging the phone call as potentially fraudulent; and
   providing an alert to the receiving device, the alert signaling to a user of the receiving device that the phone call is potentially fraudulent.

8. The computer-implemented method of claim 1, wherein the defined operation comprises terminating the phone call.

9. The computer-implemented method of claim 1, wherein:
   the identification data comprises a token identifying a caller of the sending device; and
   identifying the attribute assertion from the identification data comprises transmitting the token to the trusted authority server;
   receiving the attribute assertion comprising the signed attribute of the phone call from the trusted authority server, the signed attribute being signed using a private key of the trusted authority server; and
   validating the signed attribute using a public key of the trusted authority server.

10. The computer-implemented method of claim 1, wherein the signed attribute of the phone call is valid uniquely for the phone call.

11. The computer-implemented method of claim 1, wherein identifying the attribute assertion from the identification data comprises validating the signed attribute using a public key of the trusted authority server, the signed attribute being received from the sending device in the identification data.

12. A computer readable medium storing instructions that, when executed by a computing device having one or more processors, causes the one or more processors to perform operations comprising:
   receiving, by a receiving device, a phone call from a sending device;
   receiving identification data in parallel with the phone call, the identification data describing context of the phone call;
   identifying an attribute assertion from the identification data, the attribute assertion comprising a signed attribute of the phone call, the signed attribute being signed by a trusted authority server;

determining verbally expressed content of the phone call;

analyzing the verbally expressed content of the phone call against the signed attribute including comparing the verbally expressed content with the signed attribute; and performing a defined operation based on a result of the analysis of the content against the signed attribute.

13. The computer readable medium of claim 12, wherein determining the content of the phone call comprises generating a transcription of the phone call during the phone call.

14. The computer readable medium of claim 13, wherein determining the content of the phone call is based on the transcription.

15. The computer readable medium of claim 12, wherein determining the content of the phone call comprises determining a verbal identification of a caller of the sending device based on verbal information provided by the caller.

16. The computer readable medium of claim 15, wherein the signed attribute comprises a verified identity of the caller and analyzing the content of the phone call against the signed attribute comprises determining whether the verbal identification of the caller matches the verified identity of the caller.

17. The computer readable medium of claim 12, wherein:
the signed attribute specifies a projected topic of the phone call; and
analyzing the content of the phone call against the signed attribute comprises identifying a topic of the phone call and comparing the topic of the phone call to the projected topic specified by the signed attribute.

18. The computer readable medium of claim 12, wherein:
the identification data comprises a token identifying a caller of the sending device; and
identifying the attribute assertion from the identification data comprises:
transmitting the token to the trusted authority server;
receiving the attribute assertion comprising the signed attribute of the phone call from the trusted authority server, the signed attribute being signed using a private key of the trusted authority server; and
validating the signed attribute using a public key of the trusted authority server.

19. The computer readable medium of claim 12, wherein identifying the attribute assertion from the identification data comprises validating the signed attribute using a public key of the trusted authority server, the signed attribute being received from the sending device in the identification data.

20. A computing device comprising:
system memory;
at least one processor;
an attribute validation module residing in the system memory programmed to receive a phone call from a sending device, receive identification data in parallel with the phone call, the identification data describing context of the phone call, and to identify an attribute assertion from the identification data, the attribute assertion comprising a signed attribute of the phone call, the signed attribute being signed by a trusted authority server;
a call transcription module residing in the system memory programmed to determine verbally expressed content of the phone call; and
a call analysis module residing in the system memory programmed to analyze the verbally expressed content of the phone call against the signed attribute including comparing the verbally expressed content with the signed attribute, and perform a defined operation based on a result of the analysis of the content against the signed attribute.

* * * * *